United States Patent
Gonzalez et al.

(10) Patent No.: US 11,014,045 B2
(45) Date of Patent: May 25, 2021

(54) FLUID FOR CARRYING OUT POLLUTION CONTROL IN HEAT ENGINES, AND METHODS FOR PREPARING SAID FLUIDS BY PRODUCING A HOMOGENEOUS SOLUTION

(71) Applicant: IFP Energies nouvelles, Rueil-Malmaison (FR)

(72) Inventors: Serge Gonzalez, Jonage (FR); Jacques Vallet, Lyons (FR); David Pasquier, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 69 days.

(21) Appl. No.: 15/775,436

(22) PCT Filed: Oct. 20, 2016

(86) PCT No.: PCT/EP2016/075197
§ 371 (c)(1),
(2) Date: May 11, 2018

(87) PCT Pub. No.: WO2017/080778
PCT Pub. Date: May 18, 2017

(65) Prior Publication Data
US 2018/0345216 A1 Dec. 6, 2018

(30) Foreign Application Priority Data
Nov. 13, 2015 (FR) ...................................... 1560907

(51) Int. Cl.
*F01N 3/20* (2006.01)
*F01N 3/029* (2006.01)
*B01D 53/90* (2006.01)
*B01D 53/94* (2006.01)
*B01J 31/02* (2006.01)

(52) U.S. Cl.
CPC .......... *B01D 53/90* (2013.01); *B01D 53/944* (2013.01); *B01D 53/9409* (2013.01); *B01J 31/0209* (2013.01); *B01J 31/0222* (2013.01); *B01J 31/0237* (2013.01); *F01N 3/029* (2013.01); *F01N 3/206* (2013.01); *B01D 2251/206* (2013.01); *B01D 2251/2067* (2013.01); *B01D 2251/302* (2013.01); *B01D 2251/304* (2013.01); *B01D 2251/404* (2013.01); *B01D 2251/406* (2013.01); *B01D 2251/60* (2013.01); *B01D 2251/90* (2013.01); *B01D 2251/902* (2013.01); *B01D 2251/904* (2013.01); *B01D 2255/20707* (2013.01); *B01D 2255/20738* (2013.01); *B01D 2255/20761* (2013.01); *B01D 2255/20792* (2013.01); *B01D 2255/705* (2013.01); *B01D 2258/012* (2013.01); *B01D 2259/124* (2013.01); *F01N 2610/01* (2013.01); *F01N 2610/02* (2013.01)

(58) Field of Classification Search
None
See application file for complete search history.

(56) References Cited

U.S. PATENT DOCUMENTS

| 5,360,459 | A | * | 11/1994 | Kolp | C10L 1/301 |
| | | | | | 44/358 |
| 5,565,091 | A | * | 10/1996 | Iino | B01J 23/85 |
| | | | | | 208/216 R |
| 6,051,040 | A | | 4/2000 | Peter-Hoblyn | |
| 8,845,986 | B2 | * | 9/2014 | Senior | C10L 9/10 |
| | | | | | 423/210 |
| 8,999,277 | B2 | * | 4/2015 | Ayyappan | F01N 3/2066 |
| | | | | | 252/182.12 |
| 2003/0226312 | A1 | * | 12/2003 | Roos | F02M 25/0228 |
| | | | | | 44/280 |
| 2008/0250703 | A1 | * | 10/2008 | Krogh | C10L 1/106 |
| | | | | | 44/384 |
| 2009/0000186 | A1 | * | 1/2009 | Sanders | C10L 1/10 |
| | | | | | 44/321 |
| 2013/0000283 | A1 | | 1/2013 | Lee | |

FOREIGN PATENT DOCUMENTS

| CN | 1467267 A | | 1/2004 |
| CN | 104829342 A | | 8/2015 |
| EP | 2541012 A2 | | 1/2013 |
| FR | 1462228 A | | 4/1966 |
| WO | 97/28358 A1 | | 8/1997 |
| WO | 2005002902 | * | 6/2005 |

OTHER PUBLICATIONS

International Search Report for PCT/EP2016/075197, dated Mar. 17, 2017; English translation submitted herewith (9 pgs.).
Qu Fengdong et al: "Fe3O4-NiO core-shell composites: Hydrothermal synthesis and toluene sensing pr", Oct. 1, 2014 (Oct. 1, 2014), Materials Letters, pp. 167-170.
Office Action in CN Appl. No. 201680066533.7 dated Jul. 1, 2020 (with English Translation).

* cited by examiner

*Primary Examiner* — Sheng H Davis
(74) *Attorney, Agent, or Firm* — Fitch, Even, Tabin & Flannery, LLP

(57) ABSTRACT

The present invention describes a fluid which is suitable for the decontamination of heat engines which can carry out both, at the same time, the catalytic reduction of oxides of nitrogen (NOx) contained in exhaust gases and assist in the regeneration of the particulate filter (PF). The invention also describes several embodiments of said fluid.

11 Claims, No Drawings

FLUID FOR CARRYING OUT POLLUTION CONTROL IN HEAT ENGINES, AND METHODS FOR PREPARING SAID FLUIDS BY PRODUCING A HOMOGENEOUS SOLUTION

CROSS-REFERENCE TO RELATED APPLICATIONS

This application is a U.S. national phase application filed under 35 U.S.C. § 371 of International Application No. PCT/EP2016/075197, filed Oct. 20, 2016, designating the United States, which claims priority from French Patent Application No. 15/60.907, filed Nov. 13, 2015, which are hereby incorporated herein by reference in their entirety.

FIELD OF THE INVENTION

The present invention describes a single fluid for automobile decontamination, enabling two distinct operations to be carried out: selective catalytic reduction of NOx using Selective Catalytic Reduction technology, usually given the acronym SCR, as well as with assisting in the regeneration of the particulate filter (PF), this aid to regeneration possibly manifesting itself either by promoting the continuous regeneration of the particulate filter, or by accelerating the combustion of soot during the active regeneration phases of the PF, or by a combination of these two advantages. The fluid in accordance with the invention is homogeneous and has the characteristics of stability over time, or upon variations in the temperature or pH. The present invention describes various embodiments for the production of the fluid as well as the embodiment for use of this fluid.

PRIOR ART

Various technologies have been applied in order to reduce the harmful emissions of exhaust gases which are emitted by diesel heat engines, in particular oxides of nitrogen (NOx) and particles.

One example of an exhaust line integrating the system for the treatment of NOx by selective catalytic reduction (denoted SCR, the abbreviation for Selective Catalytic Reduction), and the particulate filter (abbreviated to PF) is given in the patent FR 2 947 004. These two decontamination systems may also be combined into a single module which is known by the term SCR on filter or SCRF or SDPF or SCRoF.

We have not found a fluid in the literature which can be used to combine the functions of reducing oxides of nitrogen and assisting in the regeneration of trapped particles of soot.

AdBlue® (or AUS32 or DEF or ARLA32) is a 32.5% by weight solution of urea in pure water which is used for the selective reduction of oxides of nitrogen in the context of SCR technology for road and non-road applications.

The general concept of mutualisation of these decontamination functions formed the subject matter of the French patent application 14/62.228 filed at the end of 2014. The present application may be considered to be an improvement of the application 14/62.228.

BRIEF DESCRIPTION OF THE INVENTION

The present invention describes a fluid for the decontamination of heat engines, in particular diesel engines, in order to be able to carry out the selective catalytic reduction of oxides of nitrogen contained in exhaust gases (the function termed SCR) at the same time as assisting in the regeneration of the particulate filter (PF) by catalytic combustion of particles of soot deposited in the particulate filter (the function termed assistance of the regeneration of PF), this regeneration assistance possibly being manifested either by promotion of the continuous regeneration of the particulate filter, or by accelerating the combustion of soot during the active PF regeneration phases, or by a combination of these two advantages.

The use of a catalyst for the oxidation of soot differs from the prior art cited above in that it is injected directly into the exhaust and thus does not pass through the combustion chamber of the engine. Injection of fluid in accordance with the invention is triggered by the engine computer in order to respond to a need to provide the necessary quantity of ammonia over the SCR catalyst in order to carry out efficient reduction of the NOx.

The injections are carried out in a regular manner in accordance with a period which is typically in the range from a few milliseconds to a few tens of seconds depending on the operational conditions of the engine, which means that homogeneous mixing of the catalyst with the soot can be promoted and intimate contact between the soot and the catalyst can be guaranteed.

Finally, the fact of injecting the fluid in accordance with the invention means that either the phenomenon of continuous regeneration of the particulate filter is promoted, and thus the active PF regeneration periods can be spaced apart, or that combustion of the soot during the active PF regeneration phases is accelerated, meaning that fuel consumption in respect of this phase can be limited and/or the chances of burning a large mass of soot when the temperature and gas composition conditions in the exhaust are favourable to this active regeneration are maximized, or a combination of these two advantages.

The fluid in accordance with the invention consists of a homogeneous solution, which may be clear or transparent or translucent or opaque, constituted by at least one complexed, liganded or chelated metal ion, in an aqueous solution of at least one reducing compound or precursor of a reducing agent, the metal ion or ions being selected from the following list of metals: Fe, Cu, Ni, Co, Zn, Mn, Ti, V, Sr, Pt, Ce, Ca, Li, Na, Nb.

Preferably, the metal ion or ions are selected from the following list: Fe, Ce, Cu, Sr.

In accordance with a variation of the fluid for the decontamination of diesel heat engines in accordance with the invention, the reducing compound or precursor of a reducing agent is selected from urea, ammonia, formamide, and ammonium salts, in particular ammonium formate, ammonium carbamate, and guanidine salts, in particular guanidinium formate.

In accordance with another variation of the fluid for the decontamination of heat engines, the concentration of metal ion, in the ionic or complexed, chelated or liganded form, in the solution of the reducing compound or precursor of a reducing agent is in the range 10 to 10000 ppm, preferably in the range 10 to 5000 ppm, and more preferably in the range 10 to 2000 ppm.

In accordance with another variation of the fluid for the decontamination of heat engines, in particular diesel engines, in accordance with the invention, the ligand of the metal ion is monodentate, bidentate or polydentate in nature and belongs to one of the following families: amino or polyaminocarboxylic acids, aryl- and arylalkylsulfonates, phosphonates, aminoalcohols, or polycarboxylic acids.

In accordance with another variation of the fluid for the decontamination of heat engines, in particular diesel engines, in accordance with the invention, the metal ion is introduced in the form of soluble organic salts selected from formates, acetates, citrates, fumarates, succinates, and nitrilotri acetates.

In accordance with another variation of the fluid for the decontamination of heat engines, in particular diesel engines, in accordance with the invention, the metal ion is introduced in the form of hydrated or non-hydrated salts such as sulfates, nitrates, chlorides, Mohr's salt (in the case of Fe).

In accordance with another variation of the fluid for the decontamination of heat engines, in particular diesel engines, in accordance with the invention, the complexing agent is selected from the following compounds: DETPA or DTPA (diethylenetriamine penta acetic acid), EDTA (ethylenediamine tetra acetic acid), HEDTA or HEEDTA (N-(2-hydroxyethyl) ethylenediamine triacetic acid), MGDA (methylglycine diacetic acid), EDDHA (N,N'-ethylene bis (2-[2-hydroxyphenyl]glycine), NTA (nitrilotriacetic acid), GLDA (N,N-bis(carboxymethyl)-L-glutamic acid), ODS (oxydisuccinic acid), EDDS (ethylenediamine-N—N'-disuccinic acid), IDA (iminodiacetic acid), EGDTA (ethyleneglycol tetra acetic acid), Tiron (4,5-dihydroxy-1,3-benzenedisulfonic acid), and their salts.

In accordance with another variation of the fluid for the decontamination of heat engines in accordance with the invention, the reducing compound or precursor of a reducing agent is urea, 32.5±0.7% by weight in solution in pure water and complying with the specifications of the standard ISO 22241.

In accordance with a preferred variation of the present invention, the solution containing the reducing compound or compounds or the precursor or precursors of a reducing agent is prepared from a product which complies with the specifications of the standard ISO 22241, for example the commercial products AdBlue®, DEF, AUS32 or ARLA32.

In accordance with another preferred variation of the present invention, the solution containing the reducing compound or compounds or the precursor or precursors of a reducing agent is prepared from a product having the physical and chemical characteristics of the standard ISO 22241-1, for example the commercial product Diaxol®.

Hereinbelow, the term Adblue® will be used to designate any of the following products indifferently: Adblue®, DEF, AUS32, ARLA32 or Diaxol®.

The fluid for the decontamination of heat engines in accordance with the invention is preferably stable at a temperature in the range −11° C. to +60° C.

Finally, the fluid for the decontamination of heat engines has good stability as regards light.

The invention also pertains to several processes for the preparation of the fluid in accordance with the invention.

In accordance with a first process for the preparation of the engine decontamination fluid in accordance with the invention, a metallic complex is added to an aqueous solution of at least one reducing compound or precursor of a reducing agent.

In accordance with a second process for the preparation of the fluid for the decontamination of engines in accordance with the invention, a complexing agent is added to the aqueous solution of at least one reducing compound or precursor of a reducing agent, followed by a precursor compound of the metal ion which is insoluble or partially soluble in the solution of the reducing compound, this precursor compound of the metal ion being selected from metal sulfate or nitrate salts.

In accordance with a third process for the preparation of the fluid for the decontamination of heat engines in accordance with the invention, a complexing agent is added to the aqueous solution of at least one reducing compound or precursor of a reducing agent, followed by a precursor compound of the metal ion which is insoluble or partially soluble in the solution of reducing compound, this precursor compound of the metal ion being selected from a metal oxide, a hydroxide or an oxyhydroxide.

In accordance with a fourth process for the preparation of the fluid for the decontamination of heat engines in accordance with the invention, the precursor compound of the metal ion is partially dissolved, and the soluble fraction of the heterogeneous mixture is recovered by filtration.

Finally, the present invention also concerns the use of engine decontamination fluid in an internal combustion engine of the diesel type, the injection of said fluid being carried out upstream of the SCR and PF systems for the treatment of exhaust gases and being operated in a regular manner as a function of the operational conditions of the heat engine.

DETAILED DESCRIPTION OF THE INVENTION

The invention consists of a multi-functional fluid for the decontamination of exhaust gases emitted by an internal combustion engine. The multi-functional fluids in accordance with the invention promote either the continuous regeneration of the particulate filter or the combustion of soot during the active regeneration phases of the PF, or can be used to combine these two advantages.

This fluid incorporates a catalytic additive for regeneration of the particulate filter with an aqueous solution containing at least one reducing agent or at least one precursor of a reducing agent for NOx.

The production of the fluid in accordance with the invention results in a completely transparent and homogeneous solution which has the characteristics of stability over time, and in a pH range of 7 to 12, this being up to a temperature of 60° C.

The fluid in accordance with the invention may be produced from a commercially available solution of AdBlue® which complies with the ISO 22241 specifications.

One of the advantages of the fluid in accordance with the invention resides in the fact that the composition of this fluid combines the two functions of engine decontamination in a single fluid. One of the other advantages of the invention is that it does not substantially modify the properties of density, viscosity and storage of the solution of AdBlue®, which in practice means that it is not necessary to modify the system for injecting AdBlue® into the engine in order to benefit from the advantages of the invention.

The principle of the fluid in accordance with the invention is to combine in the solution a compound such as urea, which will act as a reducing agent or precursor of a reducing agent such as ammonia, and a metal ion which, in the exhaust line under the effect of temperature and the residual oxygen of the exhaust gases, will be transformed into a compound which is capable of reducing the oxidation temperature of the soot, or indeed to increase the rate of oxidation by a catalytic process, and thus assist in regeneration of the PF.

Various ways of producing the fluid in accordance with the invention exist, corresponding to several variations.

The simplest consists of modifying a commercial solution of AdBlue® or of producing a solution of urea which complies with ISO 22241-1 specifications, or in fact of using another reducing compound such as ammonia, for example.

It is possible to produce transparent, homogeneous solutions with different compounds which are capable of providing a sufficient concentration of at least one metal ion promoting the oxidation of soot after decomposition of that compound in the exhaust line. The remainder of the description details several embodiments of the fluid in accordance with the invention.

The metal ions in solution may be supplied by several families of compounds. These compounds may or may not be soluble in the medium. In the case of compounds which are not soluble or partially soluble, it is the particular mode of preparation and use of a complexing agent which means that the metal ions can be taken up into solution. In the case of insoluble or partially soluble compounds, metal salts such as metal sulfates, nitrates, chlorides, oxides, hydroxides and oxyhydroxides may be mentioned.

In accordance with a first embodiment, a soluble compound which contains a source of metal is added to the solution of AdBlue®. This compound may be a metal complex, for example.

Various iron, copper, or manganese complexes, for example, are commercially available and may be added to the solution of AdBlue® in order to obtain a transparent and homogeneous solution. When no commercially available complexes exist, it is also possible to carry out the synthesis of the desired metallic complex, to isolate it and to add it to the solution of AdBlue®.

An example of the synthesis of an iron-urea complex that may be cited is that described by M. Ilis et al. (*Analele Universității din Bucuresti—Chimie, Anul XIII (serie nouă)*, vol. I-II, 2004, pages 173-178).

In the second embodiment, initially, an organic derivative which will enable an insoluble compound to be dissolved and which is selected from metal salts such as sulfates, nitrates, chlorides etc, is added to the solution of reducing compound.

In a third embodiment, a metal oxide, a hydroxide or an oxyhydroxide is dissolved in the AdBlue® with the aid of a complexing agent, for example.

In a fourth embodiment, a metal compound is partially dissolved in the AdBlue® and the filtrate which complies with the fluid specifications of the invention is recovered.

The chemistry of metal complexes is very rich and has many applications in fields as widely varied as the papermaking industry, the water treatment industry, the textile industry, medicine and agrochemisty, for example.

There are many complexing agents or chelating agents; they belong to a variety of chemical families and may be natural or synthesized compounds.

The article by Robert D. Hancock and Arthur E. Martell (Ligand Design for Selective Complexation of Metal Ions in Aqueous Solution (*Chem. Rev.* 1989, pp 1875-1914) describes a detailed approach for the design and choice of the complexing agents.

Reference may also be made to the book by J. Kragten: Atlas of Metal-Ligand Equilibria in Aqueous Solution (Kragten/Ellis Horwood Ltd., 1978) to provide a clearer view of the solubility conditions for species, and to the article by L. Lattuada et al. regarding the synthesis and applications of bifunctional polyamino polycarboxylic chelating agents (*Chem. Rev.* 40, pp 3019-3049-2011).

In the context of the present invention, any complexing agent or chelating agent or ligands may be used, provided that they satisfy the criteria for final solubility, stability and transparency of the fluid for a pH in the range 7 to 12.

The ligands may be of the monodentate, bidentate or polydentate type and belong to one of the following families: amino acids or polyamino polycarboxylic acids, phosphonates, aminoalcohols or polycarboxylic acid, for example.

The metal content in solution in the ionic or complexed form, or in the chelated or liganded form, in the final composition of the fluid may be in the range 1 to 10000 ppm, preferably in the range 1 to 5000 ppm, and more preferably in the range 10 to 2000 ppm.

Reducing the metal content is preferable, as this can prevent the accumulation of metallic ash in the PF.

The fluid as described in the present invention is stable over time for a pH in the range 7 to 12. The action of light does not modify the stability of the solution and the crystallization conditions and the stability of the urea are not affected.

Prolonged exposure to temperatures of +60° C. also do not affect this stability.

Thawing of the solution after freezing to the core can recover the properties of the solution before freezing (no precipitation). Finally, in the case in which the fluid is prepared from a solution of urea or AdBlue®, the quantity of the agent or agents added to the solution remains low and can comply with the normalized concentration of urea of 32.5±0.7%.

The inventive merit of the invention resides in the judicious selection of the components of the formulation. It is not obvious to maintain the metal ions in solution in a solution of urea which is in fact basic. In fact, naturally, the solutions containing metal ions such as $Fe^{2+}$, $Fe^{3+}$, $Mn^{2+}$, $Cu^{2+}$, $Sr^{2+}$, $Ce^{3+}$, $Ce^{4+}$ in particular have a tendency to form insoluble precipitates of metal hydroxides at a neutral or basic pH.

Examples in Accordance with the Invention

The examples below describe four embodiments for the preparation of the fluid in accordance with the invention. The fluids could be prepared at ambient temperature or at a temperature of less than 60° C.

When the fluid is not homogeneous, it does not comply with the specifications. These few cases demonstrate that obtaining a fluid in accordance with the invention is not a systematic occurrence. All of the examples described were produced with a commercially available solution of AdBlue®.

Examples in Accordance with Embodiment 1

The fluid was produced as follows: 100 g of AdBlue® was introduced into a 250 cm³ glass flask containing a bar magnet; a quantity of compound corresponding to a final concentration in the solution of 350 ppm of metal was added. After stirring for 5 minutes at ambient temperature, the appearance of the composition was evaluated.

TABLE 1

Embodiment 1

| Example | AdBlue ® | Compound | Appearance of fluid |
|---|---|---|---|
| 1 | 100 g | $FeSO_4 \cdot 7 H_2O$ | Heterogeneous - blue precipitate |
| 2 | 100 g | Iron II acetate | Heterogeneous - blue precipitate |
| 3 | 100 g | Ferric ammonium citrate | Homogeneous - amber |
| 4 | 100 g | Ethylenediamine tetra acetic acid ferric monosodium salt | Homogeneous - amber |
| 5 | 100 g | Ethylenediamine tetra acetic acid cuprous disodium salt | Homogeneous - blue |

It can be seen that compositions of the fluid in accordance with the invention do exist which provide homogeneous, transparent solutions with no deposits of solid, with different metal cations.

It is also possible to use ferricyanides, or hexamine cobalt chloride. Other compounds which are soluble in a solution of urea or of AdBlue® may be used.

In Table 1, Examples 1 and 2 are not in accordance with the invention because they resulted in a heterogeneous fluid.

Examples in Accordance with Embodiment 2

The fluid was produced as follows: 50 g of AdBlue® was introduced into a 100 cm³ glass flask containing a bar magnet; a complexing agent was added.

The complexing agent was dissolved with stirring. Next, a quantity of compound corresponding to a final concentration in the solution of 350 ppm of metal was added. The default setting we used was a molar ratio of complexing agent/metal compound equal to 2. After stirring for 5 minutes at ambient temperature, the appearance of the composition was evaluated.

TABLE 2

Embodiment 2

| Example | AdBlue ® | Complexing agent | Compound | Appearance of fluid |
|---|---|---|---|---|
| 6 | 50 g | None | Mohr's salt | Heterogeneous - blue precipitate |
| 7 | 50 g | Tiron | Mohr's salt | Homogeneous and translucent - wine red |
| 8 | 50 g | None | $FeSO_4 \cdot 7 H_2O$ | Heterogeneous - blue precipitate |
| 9 | 50 g | Tiron | $FeSO_4 \cdot 7 H_2O$ | Homogeneous and translucent - wine red |
| 10 | 50 g | DETPA | $FeSO_4 \cdot 7 H_2O$ | Homogeneous - bright yellow |
| 11 | 50 g | DETPA | $Fe_2(SO_4)_3$ | Homogeneous - golden yellow |
| 12 | 50 g | Trilon (30% in water) | $FeSO_4 \cdot 7 H_2O$ | Homogeneous - greeny-yellow |
| 13 | 50 g | Trilon (30% in water) | $Fe(NO_3)_3 \cdot 9 H_2O$ | Homogeneous - greenish |
| 14 | 50 g | EDTA | $Fe(NO_3)_3 \cdot 9 H_2O$ | Homogeneous - yellow |
| 15 | 50 g | EDTA tetrasodium | $Fe(NO_3)_3 \cdot 9 H_2O$ | Homogeneous - yellowy pink |

The molar ratio of complexing agent/compound was sufficient to obtain solubility.

The fluid could be prepared in different manners, but preferably it was carried out at ambient temperature by initially introducing the complexing agent into the solution of urea or AdBlue®.

Cases 6 and 8, which did not include a complexing agent, resulted in a fluid which was not in accordance with the invention.

Examples in Accordance with Embodiment 3

The fluid was produced as follows: 50 g of AdBlue® was introduced into a 100 cm³ glass flask containing a bar magnet; a complexing agent was added.

The complexing agent was dissolved with stirring. Next, a quantity of metal oxide or oxyhydroxide corresponding to a final concentration in the solution of 350 ppm of metal was added. After 5 minutes of stirring at ambient temperature, the appearance of the composition was evaluated.

TABLE 3

Embodiment 3

| Example | AdBlue ® | Complexing agent | Compound | Appearance of fluid |
|---|---|---|---|---|
| 16 | 50 g | None | ZnO | Heterogeneous - colloidal |
| 17 | 50 g | DETPA | ZnO | Homogeneous - colourless |

Examples in Accordance with Embodiment 4

The fluid was produced as follows: 50 g of AdBlue® was introduced into a 100 cm³ glass flask containing a bar magnet; a complexing agent was added.

The complexing agent was dissolved with stirring.

Next, a quantity of metal oxide or oxyhydroxide type compound corresponding to a final concentration in the solution of 500 ppm of metal was added. After 24 hours of stirring at ambient temperature, the solution was filtered and the filtrate was recovered. ICP-OES ASTM D7260 analysis was used to measure the concentration of the metal ion and to adjust it if necessary.

TABLE 4

Embodiment 4

| Example | AdBlue ® | Complexing agent | Compound | Ion content | Appearance of fluid |
|---|---|---|---|---|---|
| 18 | 50 g | Tiron | $Fe_2O_3$ | 10 mg/L | Homogeneous |
| 19 | 50 g | Tiron | FeO(OH) | <2.5 mg/L | Homogeneous |
| 20 | 50 g | Tiron | $TiO_2$ | <1.25 mg/L | Homogeneous |

Examples Illustrating the Stability of the Fluid as a Function of pH and Temperature Degradation of the solution of urea with time and temperature could cause an increase in the pH of the AdBlue®. We prepared a fluid in accordance with the invention and added an ammoniacal solution in a concentration of 20% until the pH measured 12.

The examples shown in Table 5 clearly show that the fluid of the invention can be used to preserve its homogeneous and transparent appearance at a pH which varies between at least 7 and 12.

TABLE 5

Influence of pH on the stability of different fluids in accordance with the invention

| Example | Example | Ammonia | Appearance of fluid |
|---|---|---|---|
| 21 | Example 3: 5 g | 3 g | Transparent - homogeneous amber |
| 22 | Example 10: 5 g | 3 g | Transparent - homogeneous bright yellow |
| 23 | Example 5: 5 g | 3 g | Transparent - homogeneous pale blue |

The fluid in accordance with the invention did not modify the conditions for crystallization of the urea solution. We introduced the solution of AdBlue® into a test tube which we immersed in a cold bath. We measured a crystallization temperature for the urea of −11° C.±1° C.

In order to verify that the examples of fluid in accordance with the invention did not modify the crystallization temperature, we immersed test tubes containing the fluids in accordance with the invention in a cold bath maintained at −10° C.±1° C. for one hour; we observed that at this temperature, the fluid remained transparent and homogeneous.

TABLE 6

Influence of temperature on the stability of the fluid in accordance with the invention

| Example | Example | Appearance of fluid at −10° C. |
|---|---|---|
| 24 | Example 3 | Transparent - homogeneous amber |
| 25 | Example 4 | Transparent - homogeneous amber |
| 26 | Example 5 | Transparent - homogeneous pale blue |

If we reduced the temperature to −11° C.±1° C., the fluids crystallized then became homogeneous again when the temperature was increased.

The invention claimed is:

1. A process for the preparation of a fluid for the decontamination of heat engines, in order to be able to carry out both, at the same time, the selective catalytic reduction of oxides of nitrogen contained in exhaust gases as well as assisting in the regeneration of the particulate filter by catalytic combustion of particles of soot deposited in the particulate filter, comprising:
    adding a metallic complex of a metal ion or ions selected from the following list of metals: Fe, Cu, Ni, Co, Zn, Mn, Ti, V, Sr, Pt, Ce, Ca, Li, Na, Nb to an aqueous solution of at least one reducing compound prepared from the commercially available product AdBlue® to form a homogeneous solution.

2. The process as claimed in claim 1, wherein the metal ion or ions are selected from the following list of metals: Fe, Cu, Ce, Sr.

3. The process as claimed in claim 1, wherein the metal ion is Fe.

4. A method for use of the fluid prepared by the process as claimed in claim 1, in an internal combustion engine of the diesel type, comprising injecting the fluid upstream of SCR and PF systems for the treatment of exhaust gases in a regular manner as a function of the operational conditions of the heat engine.

5. A process for the preparation of a fluid for the decontamination of heat engines in order to be able to carry out both, at the same time, the selective catalytic reduction of oxides of nitrogen contained in exhaust gases as well as assisting in the regeneration of the particulate filter by catalytic combustion of particles of soot deposited in the particulate filter, comprising forming a homogeneous solution by:
    adding a complexing agent to an aqueous solution of urea, 32.5±0.7% by weight in pure water and complying with the specifications of the standard ISO 22241-1, followed by
    adding a precursor compound of a metal ion or ions selected from the following list of metals: Fe, Cu, Ni, Co, Zn, Mn, Ti, V, Sr, Pt, Ce, Ca, Li, Na, Nb which is insoluble or partially soluble in the aqueous solution of urea, this precursor compound of the metal ion being selected from metal sulfate or nitrate salts, a metal oxide, a hydroxide or an oxyhydroxide, and
    in a case in which the precursor compound of the metal ion is partially dissolved to form a heterogeneous mixture, filtering out a soluble fraction of the heterogeneous mixture by filtration to recover a homogeneous solution.

6. The process as claimed in claim 5, wherein the metal ion or ions are selected from the following list of metals: Fe, Cu, Ce, Sr.

7. The process as claimed in claim 5, wherein the metal ion is Fe.

8. A method for use of the fluid prepared by the process as claimed in claim 5, in an internal combustion engine of the diesel type, comprising injecting the fluid upstream of SCR and PF systems for the treatment of exhaust gases in a regular manner as a function of the operational conditions of the heat engine.

9. A method for use of a fluid for the decontamination of heat engines in order to be able to carry out both, at the same time, the selective catalytic reduction of oxides of nitrogen contained in exhaust gases as well as assisting in the regeneration of the particulate filter by catalytic combustion of particles of soot deposited in the particulate filter, the fluid being prepared by a process comprising forming a homogeneous solution by:
    adding a complexing agent to an aqueous solution of at least one reducing compound or precursor of a reducing agent, followed by
    adding a precursor compound of a metal ion or ions selected from the following list of metals: Fe, Cu, Ni, Co, Zn, Mn, Ti, V, Sr, Pt, Ce, Ca, Li, Na, Nb which is insoluble or partially soluble in the solution of the reducing compound, this precursor compound of the metal ion being selected from metal sulfate or nitrate salts, a metal oxide, a hydroxide or an oxyhydroxide, and
    in a case in which the precursor compound of the metal ion is partially dissolved to form a heterogeneous mixture, filtering out a soluble fraction of the heterogeneous mixture by filtration to recover a homogeneous solution, in an internal combustion engine of the diesel type,
    the method comprising injecting the fluid upstream of SCR and PF systems for the treatment of exhaust gases in a regular manner as a function of the operational conditions of the heat engine.

10. The method as in claim 9, wherein the metal ion or ions are selected from the following list of metals: Fe, Cu, Ce, Sr.

11. The method as claimed in claim 9, wherein the metal ion is Fe.

* * * * *